United States Patent [19]

Chang

[11] Patent Number: 5,768,592
[45] Date of Patent: Jun. 16, 1998

[54] METHOD AND APPARATUS FOR MANAGING PROFILE DATA

[75] Inventor: Pohua Chang, Santa Clara, Calif.

[73] Assignee: Intel Corporation, Santa Clara, Calif.

[21] Appl. No.: 313,455

[22] Filed: Sep. 27, 1994

[51] Int. Cl.$^6$ .................................................. G06F 9/45
[52] U.S. Cl. .................................. 395/704; 395/705
[58] Field of Search ............................ 395/600, 700, 395/183.11, 183.14, 704, 705

[56] References Cited

U.S. PATENT DOCUMENTS

| | | | |
|---|---|---|---|
| 4,819,233 | 4/1989 | Delucia et al. | 371/19 |
| 5,204,956 | 4/1993 | Danuser | 395/575 |
| 5,355,487 | 10/1994 | Keller et al. | 395/650 |
| 5,428,793 | 6/1995 | Odnert et al. | 395/700 |
| 5,442,792 | 8/1995 | Chun | 395/700 |

OTHER PUBLICATIONS

"Using Profile Information to Assist Classic Code Optimizations", P. Chang et al., Soft Practice and Experience, vol. 21(12), 1301–1321, Dec. 1991.

Popescu, et al., "The Metaflow Architecture", *IEEE*, 1991, pp. 10–13 and pp. 63–73.

*Primary Examiner*—Alvin E. Oberley
*Assistant Examiner*—Kakali Chaki
*Attorney, Agent, or Firm*—Blakely, Sokoloff, Taylor & Zafman

[57] ABSTRACT

A heuristic prediction method of generating profile information for compilers in a computer system that associates profile information to attribute-vectors of a source code derived from observation points in the code during compilation. The prediction method of the present invention enables the compiler to predict the code run-time behavior even before the code has been compiled, therefore providing an ideal way to maintain profile information. In addition to heuristically predicting code run-time behavior, the compiler of the present invention includes features that allow the compiler user to generate profile information of code being compiled using conventional profile generation methods.

30 Claims, 10 Drawing Sheets

METHOD AND APPARATUS FOR MANAGING PROFILE DATA

BACKGROUND OF THE INVENTION

1. Field of the Invention

This invention generally applies to the area of computer software development. More specifically, the invention relates to compilers that are used to compile source code during the software development cycle.

2. Description of Related Art

Computers process information by executing a sequence of instructions, which may be supplied from a computer program written in a particular format and sequence designed to direct the computer to operate a particular sequence of operations. Most computer programs are written in high level languages such as "C" or FORTRAN which are not directly executable by the computer processor.

In order to run these high-level programs, the programs are compiled by a compiler that translates the instructions in the high-level programs into macroinstructions having a format that can be decoded and executed by the underlying processing system.

The process of translating the high-level program languages into low-level program languages such as an assembler language or machine language for the underlying processor during the software development cycle is known as compiling the source code into object code.

The source code—an input to a compiler—specifies some computation, and the object code—the output of the compiler—specifies the same computation, but in another form. For each source code there are infinitely many object codes that implement the same computation, in the sense that they produce the same output when presented with the same input.

In order to improve the performance of the object code, such as reducing its size or increasing its speed, prior art compilers while compiling the source code use code execution time information such as a basic block execution count (a block of code with no jump in except at the beginning and no jump outs except at the end), and branch probabilities to identify the most frequently executed code locations in order to produce a better object code than a code compiled without the profile information.

In order to identify the most frequently executed code locations, most compilers gather and use profile information about a code being compiled. The profile information typically describes the execution counts of basic blocks, the control flow nature of branch instructions, the invocation counts of function calls etc. To be profiled, a program must be instrumented with counting code, which may be performed by the compiler or another tool developed by the software developer.

While gathering the profile information, these compilers assign unique identifiers (IDs) to each source code entity such as loops and branches in order to collect that particular entity's profile information during the instrumentation of the code. Once the profile information is gathered, the data is recorded in a profile information database created by using the compiler assigned IDs as index keys to each associated profile information representing each code entity. The compiler then uses the assigned IDs to locate specific code entities in a source code, by matching an ID in the profile information database to a corresponding information or characteristics about an entity in the code.

Although the assignment of IDs by most compilers is very useful to associate and identify specific code entities, some drawbacks are associated with the ID-assigned method of compilation.

These drawbacks include the dynamic nature of the assigned IDs. Since IDs are assigned while a program is being compiled, any code changes by the code developer after compilation requires the reassignment of the IDs. The reassignment of IDs is necessary because the compiler maintains a single ID counter across code entities, which means that the order in which code entities are processed can affect the assignments of IDs. Thus, many entries in the profile information database may no longer be valid after a code has been compiled.

To maintain the accurateness and integrity of the profile information database, the source code must be reprofiled after every minor modification to the code after compilation. Such multiple reprofiling of the same piece of code can be time consuming.

The reassignment of IDs during the multiple compilations of the same code may also cause a misalignment of the IDs already assigned to code entities during a prior compilation step which can lead to data corruption in the profile information database. Furthermore, the problems associated with dynamic reassignment of IDs makes it difficult to motivate the code developer to implement any code modifications, especially during a period close to the release of a new code in the code development cycle.

Another drawback is that, to be profiled, the source code must first be instrumented with counting code by the compiler or an external tool developed by the code developer. The instrumented code executes several times producing a profile. The code is then recompiled with the aid of the profile information to generate an optimized object code. Adding an extra compilation adds complexity and cost to a software development process in several ways. For example, profiling can take hours and sometimes days, which sometimes makes software developers hesitant about adding additional profiling time after final bug fixes and before code testing in order not to delay the release schedule. Reprofiling a changed code may also produce differences in profile data that causes the compiler to perform different code optimizations on the code, and potentially expose different compiler bugs while the software developer struggles to by-pass compiler bugs in the final bug fix stage.

To shorten the code release cycle while maintaining code integrity, a method for compiling source code without corrupting profile data gathered during compilation and encourage code modification up until the point of code release in the code development cycle is needed.

SUMMARY OF THE INVENTION

An improved software compiler and a method for building the compiler is disclosed. The described embodiment includes a heuristic predictor for predicting the run-time behavior (profile information) of a source code being compiled. The predictor includes a hash table of rules formed by compiling various types of programs with different characteristics and merging rules generated for each program into a database of rules. The rules are formed by taking static attribute-vector of code entities of each program compiled during the development of the compiler and mapping the attribute-vectors to the profile information generated for each program compiled, so that for each attribute-vector generated there is corresponding profile information.

The preferred embodiment incorporates the instrumentation and feedback phases of the prior art into a single compilation step to allow the code developer to generate profile information specifically for a code being compiled in the instance when the prediction mechanism of the preferred embodiment mispredicts the profile information of the code.

3

The preferred embodiment includes a switching logic mechanism that allows a code developer to alternate between the predicting mechanism of the preferred embodiment or an alternate method, to generate profile data for a specific code being compiled when the compiler of the preferred embodiment is unable to predict the profile information of the code.

Advantages of the present invention include shortening the code compilation cycle. The compiler of the preferred embodiment is able to predict the run-time behavior of code being compiled thus the compiler does not have to individually profile every code compiled.

The method of the present invention also provides a merging mechanism, in which profile information from different programs are merged into a single profile information database using a set of attributes observed from one or more programs. By observing attributes from different program levels, frequently executed code regions can be distinguished and incorporated into the prediction mechanism of the compiler of the preferred embodiment to subsequently predict the run-time behavior of programs with similar characteristics.

The incorporation of the instrumentation step into the compiler of the preferred embodiment allows the code developer to make bug fixes near the end of the code development cycle without the need to reprofile the code being developed without the complication of extra compilation.

The heuristic prediction feature of the preferred embodiment also allows the code developer to use the same compiler to compile code of different programs and characteristics, without having to use different compilers for each code developed, thus saving the code developer some cost.

BRIEF DESCRIPTION OF THE DRAWINGS

The present invention will be understood more fully from the detailed description given below from the accompanying drawings of the preferred embodiment of the invention, which, however, should not be taken to limit the invention to the specific embodiments, but are for explanation and understanding only.

DETAILED DESCRIPTION OF THE PREFERRED EMBODIMENT

FIGS. 1 through 10 of the drawings disclose various embodiments of the present invention for purposes of illustrations only. One skilled in the art will readily recognize from the following discussion that alternative embodiments of the structures and methods illustrated herein may be employed without departing from the principles of the invention. The following description may include specific details associated with the apparatus and method described herein. For example, the compiler and method described herein can be practiced in a single program computer environment or in a multi-program computer environment.

Overview of the Computer System

Figure 1:
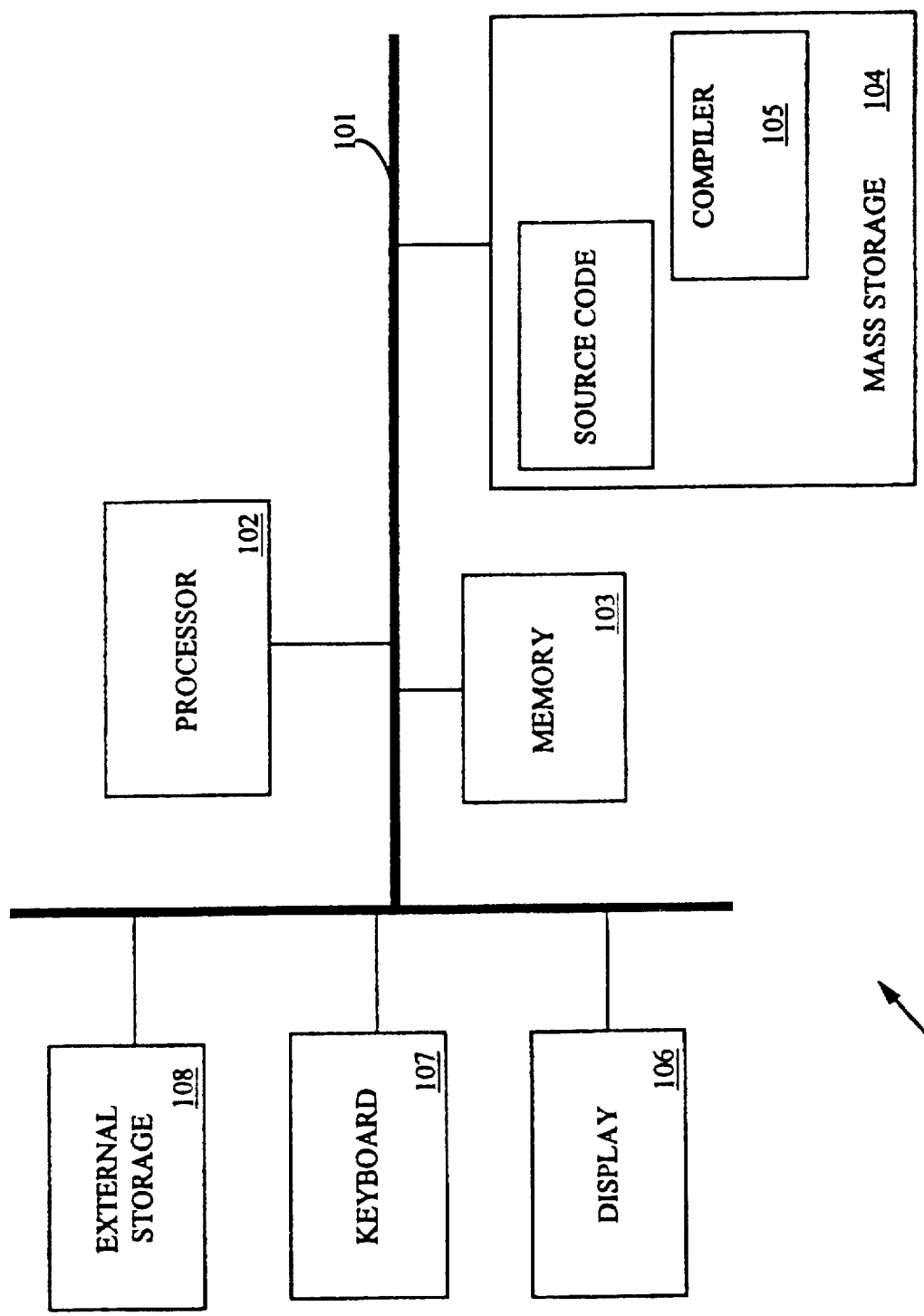
FIG. 1 is a block diagram of one embodiment of the computer system of the present invention.

Reference is first made to FIG. 1 which is an overview of a computer system of the preferred embodiment of the present invention. It will be understood that while FIG. 1 is useful for providing an overall description of the computer system of the present invention, a number of details of the system are not shown.

As illustrated in FIG. 1, the computer system 100 generally comprises a bus or other communication means 101 for communicating information, a processor 102 coupled with communication bus 101 for processing information, a memory sub-system 103 coupled with bus 101 for storing information and instructions for processor 102, and a storage device 104, such as a magnetic disk or disk drive coupled to bus 101 for storing information and instructions, such as the compiler 105 of the present invention.

The computer system 100 also includes the compiler 105 which is stored in the storage device 104 for translating a high level program into macroinstuctions, a display device 106 such as a cathode ray tube, liquid crystal display, etc., coupled to the bus 101 for displaying information to the computer user, and an alphanumeric input device 107 coupled to the bus 101 for communicating information and command selections to the processor 102.

Figure 2:
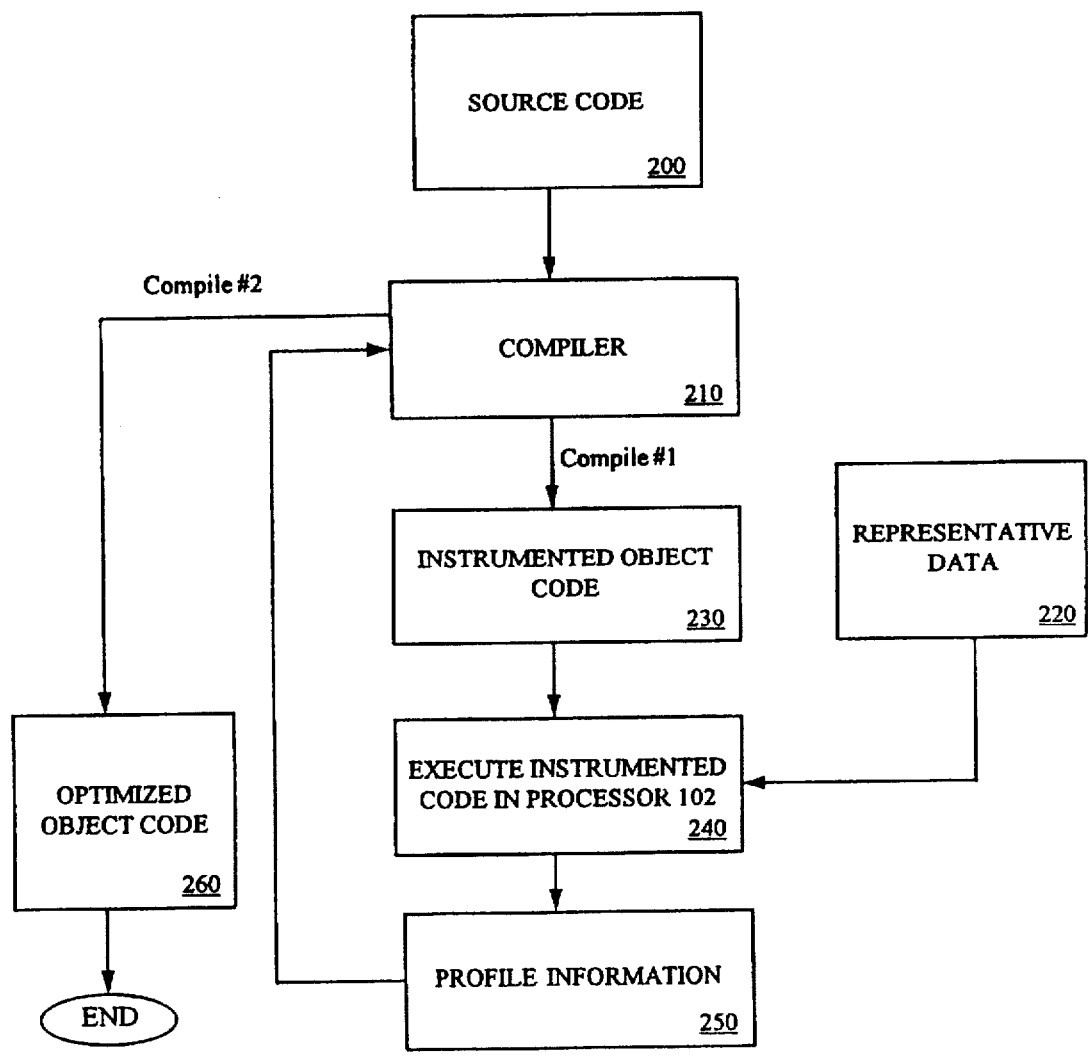
FIG. 2 is a block diagram illustrating a source code compilation cycle in the prior art.

Reference is now made to FIG. 2, which is a block diagram of a compilation cycle of the prior art. Current compilers typically perform two or more passes with more highly optimizing compilers having more passes. A pass is one phase in which the compiler reads and transforms an entire program into an object code. Subsequent optimizing passes are typically designed to be optional and may be skipped when faster compilation is the goal and a slower code is acceptable.

As illustrated at box 200, the prior art code compilation begins with a source code being supplied to a compiler at box 220 via the alphanumeric device 107 or loaded via the storage device 104.

At box 220, after the source code has been supplied to the compiler, the code developer compiles the source code using prior art instrumentation methods into an instrumented object code at box 230.

At box 230, during a first compilation pass, the source code is instrumented into an object code. The compiler instruments the source code by placing counters in various observation points in the code to collect profile data of the code being compiled. The object code is then executed in box 240 by the processor 102 with representative input data supplied from box 220. The executed object code produces profile data which is then fed back to the compiler in subsequent compilations to generate an optimized object code.

At box 250, the profile data gathered from execution of the instrumented object code is fed back to the compiler at box 210 and the source code is recompiled in a second pass with the profile information to generate an optimized object code at box 260.

As illustrated above, for the prior art compiler to generate an optimized code, the source code has to be compiled twice—once without profile information, and again after the profile information becomes available. The optimized object code generated after the second compilation of the source code runs faster and occupies less space than the un-optimized object code. Optimization of the source code results in a speedup of loops, replacing two instances of the same computations by a single copy, rearranging expression trees to minimize resources needed for expression evaluation and reduces the code size.

Figure 3:
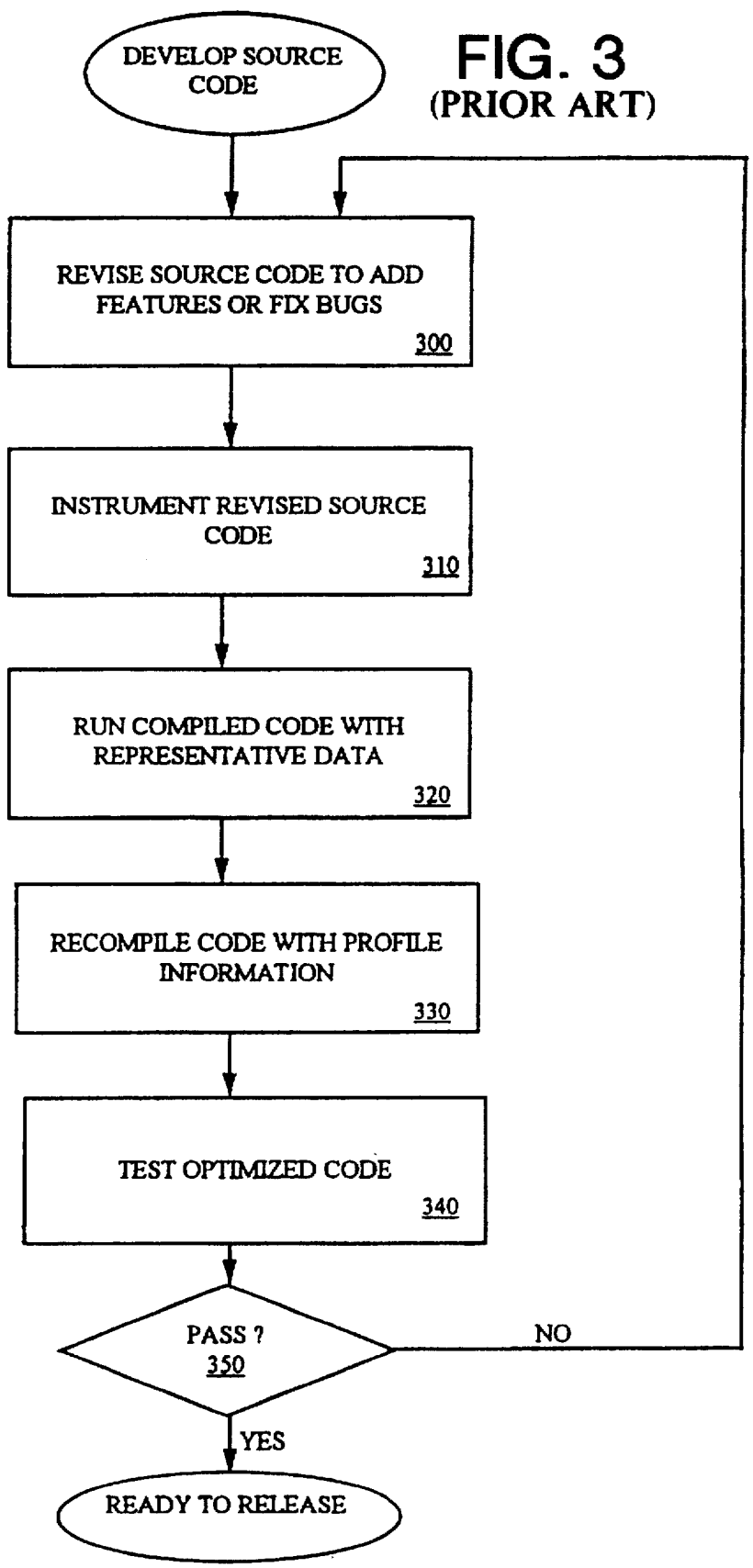
FIG. 3 is a flow chart illustrating a code release cycle of the prior art.

Reference is now made to FIG. 3, which is a flow chart illustrating a code release cycle of the prior art.

As illustrated at box 300, the code developer makes code modifications to the source code being developed, by adding new features, instructions etc. The code developer can also modify existing code (bug fixes), which may include modifications that change any major data structures, algorithms, and fixes that can affect the performance of critical code statements and the control flow of many statements (i.e., a loop macro). After developing new code or revising existing code, processing proceeds to box 310.

At box 310, the source code is instrumented by placing probes in various locations to count how many times control passes for each code procedure (e.g., each basic block) by the compiler or an instrumentation program designed by the code developer. After the source code has been instrumented, processing continues at box 320.

At box 320, the code developer tests the instrumented code with representative input data to collect profile information of the instruction counts of the code being compiled. The profile information generated is then used to recompile the source code a second time at box 330.

At box 330, the source code is recompiled using the profile information gathered from box 320, to generate an optimized object code. The optimized object code is then subjected to various tests with datasets provided by the code developer at box 340 to determine whether the code meets the expected performance.

At box 340, the code developer test runs the optimized object code. For example, if the source code is an integer program and the code developer wants to focus on conditional branch instructions, the developer maps each branch instruction to a different code optimization strategy such as reducing the computer system's resource usage and code size for branch instructions that have low execution counts.

At box 350, if the compiled code passes the test conducted at box 340, the code developer prepares to release the code at box 360; otherwise, processing continues at box 300 where the cycle is repeated.

Figure 4:
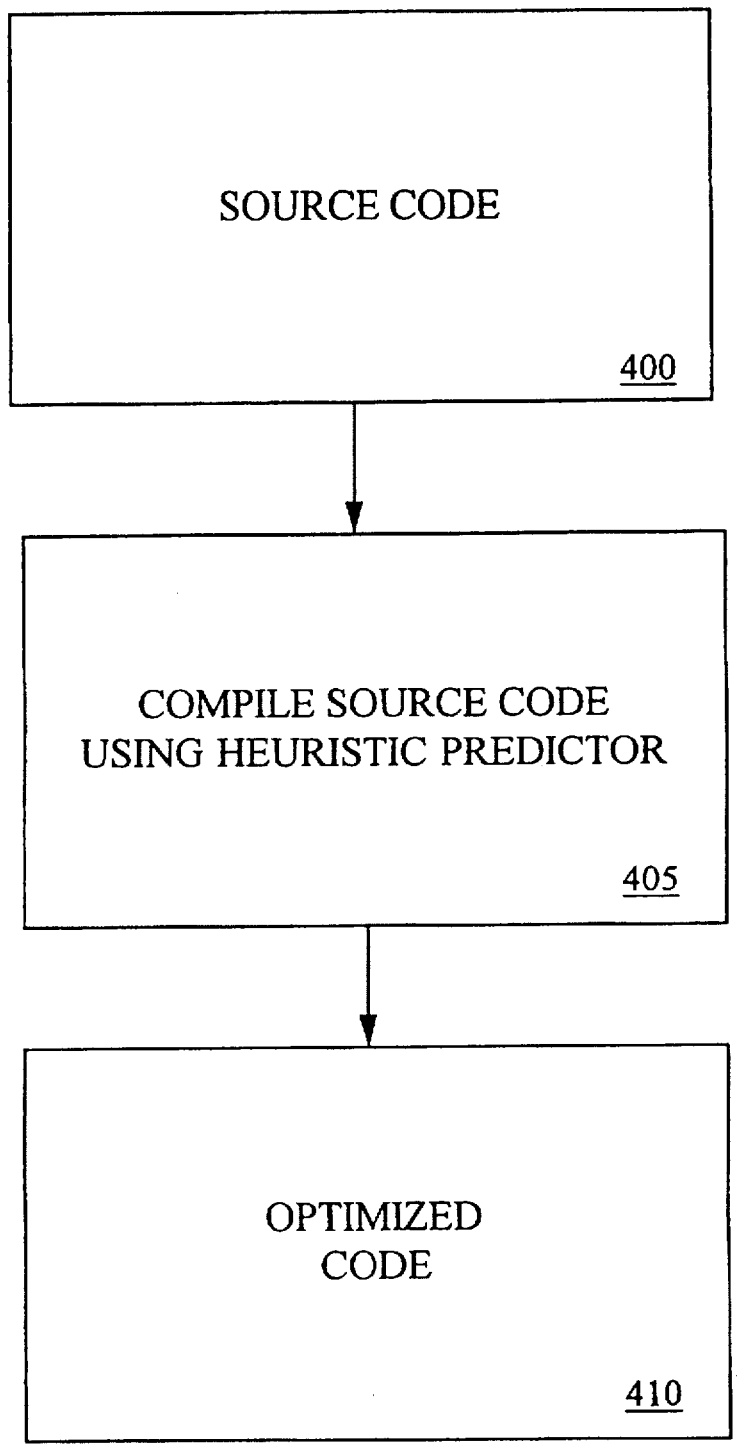
FIG. 4 is a block diagram illustrating a source code compilation cycle of the preferred embodiment.

Reference is now made to FIG. 4, which is a flow chart illustrating a code compilation cycle for a compiler of the preferred embodiment of the present invention. As illustrated in FIG. 4, compiling source code in the preferred embodiment, unlike the prior art does not require more than one compilation to generate an optimized object code. Unlike the prior art, the optimizing pass of the compiler 105 is part of the compilation cycle. The compiler 105 illustrated, optionally includes a switching logic mechanism which allows the code developer to generate profile data of a program being compiled using conventional methods of the prior art or an alternate embodiment of the present invention which is described in FIG. 10, if the compiler 105 of the preferred embodiment fails to generate an optimized code that performs as fast as the code developer had hoped for.

As illustrated at box 400, the code developer supplies the source code that will be compiled using the heuristic predictor. The compiler 105 compiles the source code at box 405 using the heuristic prediction method of the present invention to generate an optimized object code at box 410. The building of the compiler 105 and the prediction mechanism of the preferred embodiment are described in detail in FIG. 6 and Appendix 1 respectively.

Figure 5:
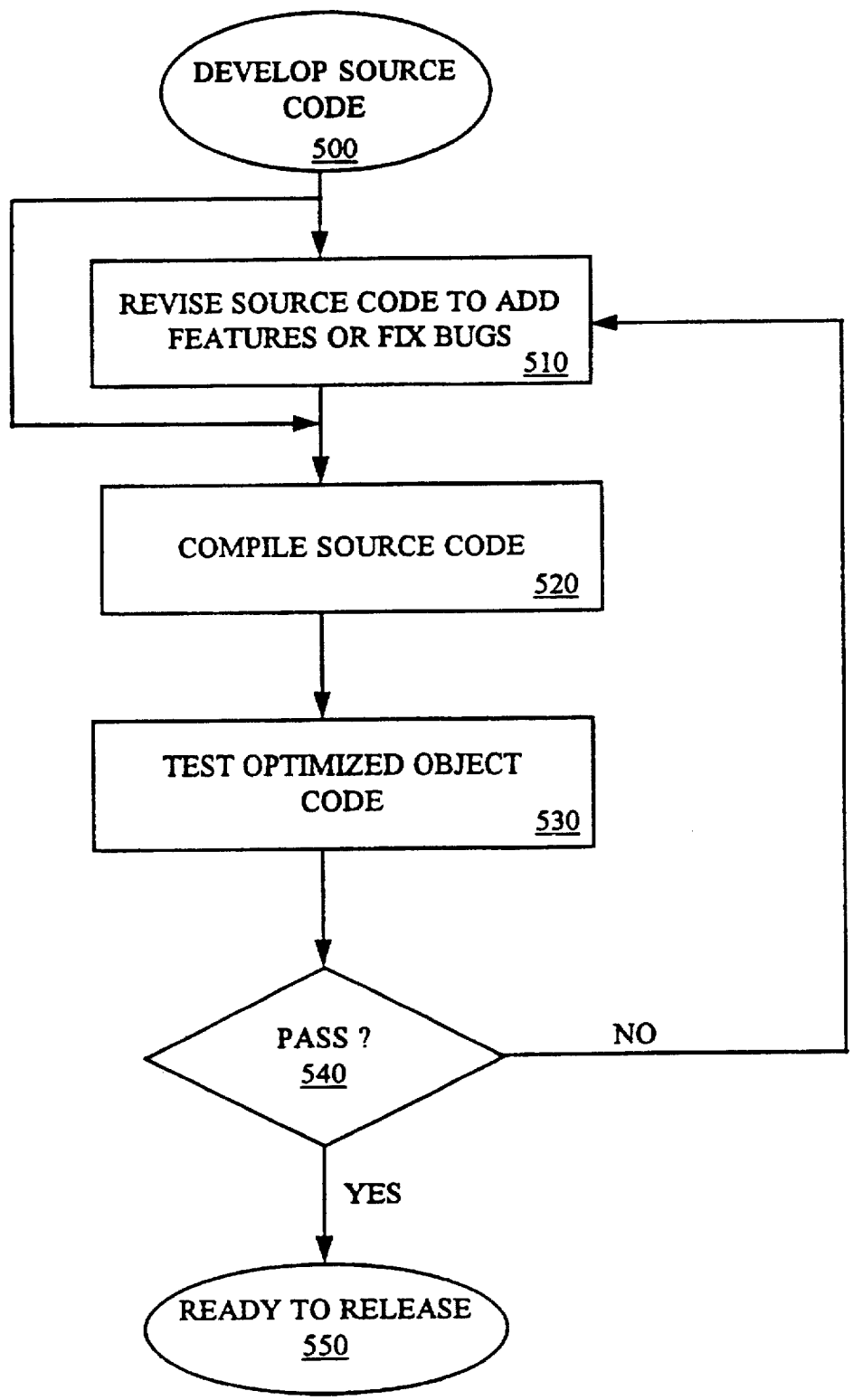
FIG. 5 is a flow chart illustrating a code release cycle of the preferred embodiment of the present invention.

Reference is now made to FIG. 5, which is a flow chart illustrating the code release cycle of the compiler of the preferred embodiment. As illustrated at box 500, the code development cycle begins with the code developer supplying a source code which may be modified at box 510. If the source code does not need modification, it is compiled at box 520.

At box 510, the code developer revises the already developed source code by adding new features or fixes any errors (bugs) detected in the code. After the code has been modified, processing continues at box 520.

At box 520, the revised source code or a newly developed code is compiled by the compiler 105 of the preferred embodiment. The compiler 105 compiles the revised or newly developed code by heuristically predicting the run-time behavior of the code thereby eliminating the separate instrumentation and recompilation steps of the prior art as illustrated in FIG. 4. An illustration of how the compiler 105 predicts the run-time behavior of code being compiled by the compiler 105 is described in FIG. 8.

At box 530, the code developer subjects the optimized object code generated at box 510 to various tests similar to that described in box 340 in FIG. 3. If the optimized object code passes the tests conducted by the code developer at box 520 as determined as box 540, the code developer readies the source code for release; otherwise, processing proceeds to box 510 where the code developer fixes any bugs that may be causing the object code to fail the tests.

Figure 6:
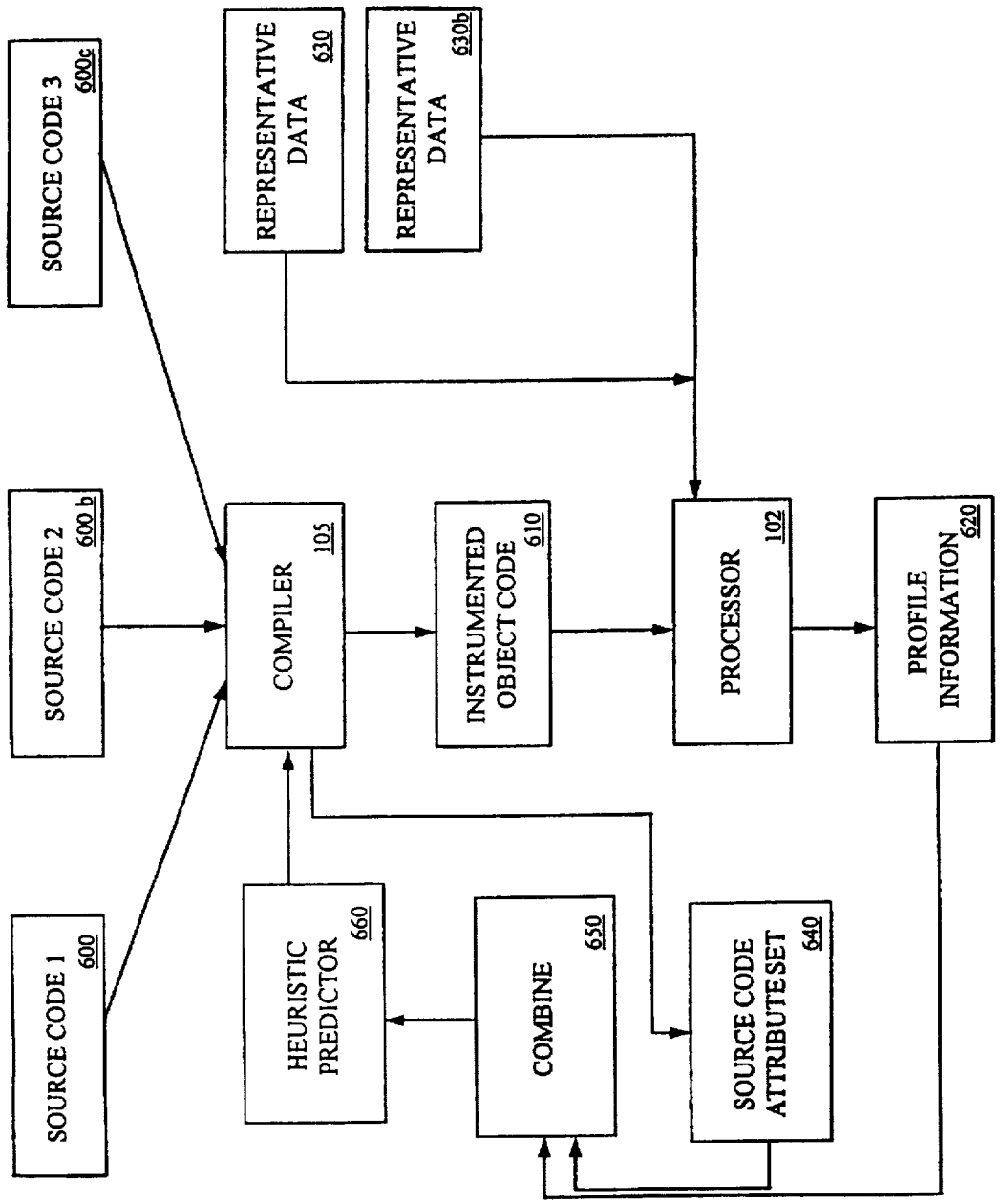
FIG. 6 is a block diagram illustrating the building of one embodiment of the compiler of the preferred embodiment.

Reference is now made to FIG. 6, which is a block diagram illustrating construction of the compiler 105 of the preferred embodiment. The compiler 105 utilizes an automatic profile-guided code optimization and merging of profile data from different programs to form a single heuristic predictor.

The compiler builder begins building the compiler 105 by compiling different types of programs of different programming categories, as illustrated in boxes 600 through 600c in the compiler 105. For example, a first category could include integer programs and a second category could include floating point application programs. For example, the compiler builder may compile such commercially available integer programs like espresso or compress, which converts Boolean equations to truth tables, and in a second category, floating point programs like spice2g6—an electronic circuit designs simulation program, and a host of other source programs, during the building of the compiler 105. As stated earlier, in building the compiler, the compiler builder uses any number of programs (e.g., 600a–c) which are each instrumented by the compiler 105 to generate an instrumented object code at box 610. The instrumentation process is described in detail in FIG. 9.

After each program has been instrumented, the instrumented program is then executed by an underlying processor with various representative input data (i.e., boxes 630–630b) supplied by the compiler builder to generate the profile data for each program at box 620.

At box 620, as each program is executed, the instrumented object code produces profile data. After the profile data of each program has been gathered, processing proceeds to box 650. Note that the steps described so far are similar to those described in the prior art's compilation method in FIG. 2. However, in the preferred embodiment the steps are performed during the building of the compiler by the compiler builder instead of during the code development cycle by the code developer.

At box 640, the compiler 105 generates a vector of attributes for each program being compiled. The attributes are a static string of bits describing various static program attributes such as the loop nesting level of a basic block or branch instruction, loop depth level of a basic block or branch instruction, if-statement nesting levels etc., that are derived from program observation points, such as the beginning and ending of a basic block or the beginning and ending of a branch instruction, during the compiling of each program.

In choosing elements to be included in the attribute set, the compiler builder decides on whether the attributes selected make an observation point in the code unique and the effect of localized source code changes on the attributes. By evaluating the effect of localized source changes to all potential attributes, the compiler builder is able to identify a set of attributes that are less sensitive to localized source changes. For example, in a localized source change which may involve converting a function definition into a macro definition, if in the process of converting, a function is lost, an attribute of a function of the function ordering in a source module is not a desirable attribute. Any attributes that depend on more than the state of a function body are not insensitive to localized source changes. The compiler builder may also insert counters at the beginning and end of a basic block or a branch instruction to determine how many times the block is executed or the branch is taken respectively.

After generating the attributes, the compiler builder then combines the profile data generated for each program in box 620 with the corresponding attribute-vectors at box 650 by mapping the attribute-vector for each program to the corresponding profile data for all the observation points in the compiled programs.

At box 650, the attribute-vectors of the different programs are paired with the corresponding profile data by creating a (attribute-vector, profile data) pair to form rules for each program with the attribute vector representing the right hand side (RHS) of the rule and the profile data representing the left hand side (LHS). The compiler builder concatenates rules from the various programs and combines all profile data that associate with the same attribute-vector in the process of forming a list of rules. For example, the execution count and branch probability of different programs can be averaged when combining the profile data of two entries with the same attribute-vectors. After forming rules for each compiled program, the compiler builder then converts the set of rules to create a common heuristic predictor for the compiler 105 at box 660. The method of combining attribute-vectors for various programs to form rules and the creating of the heuristic predictor is described in detail in FIG. 8.

Figure 8:
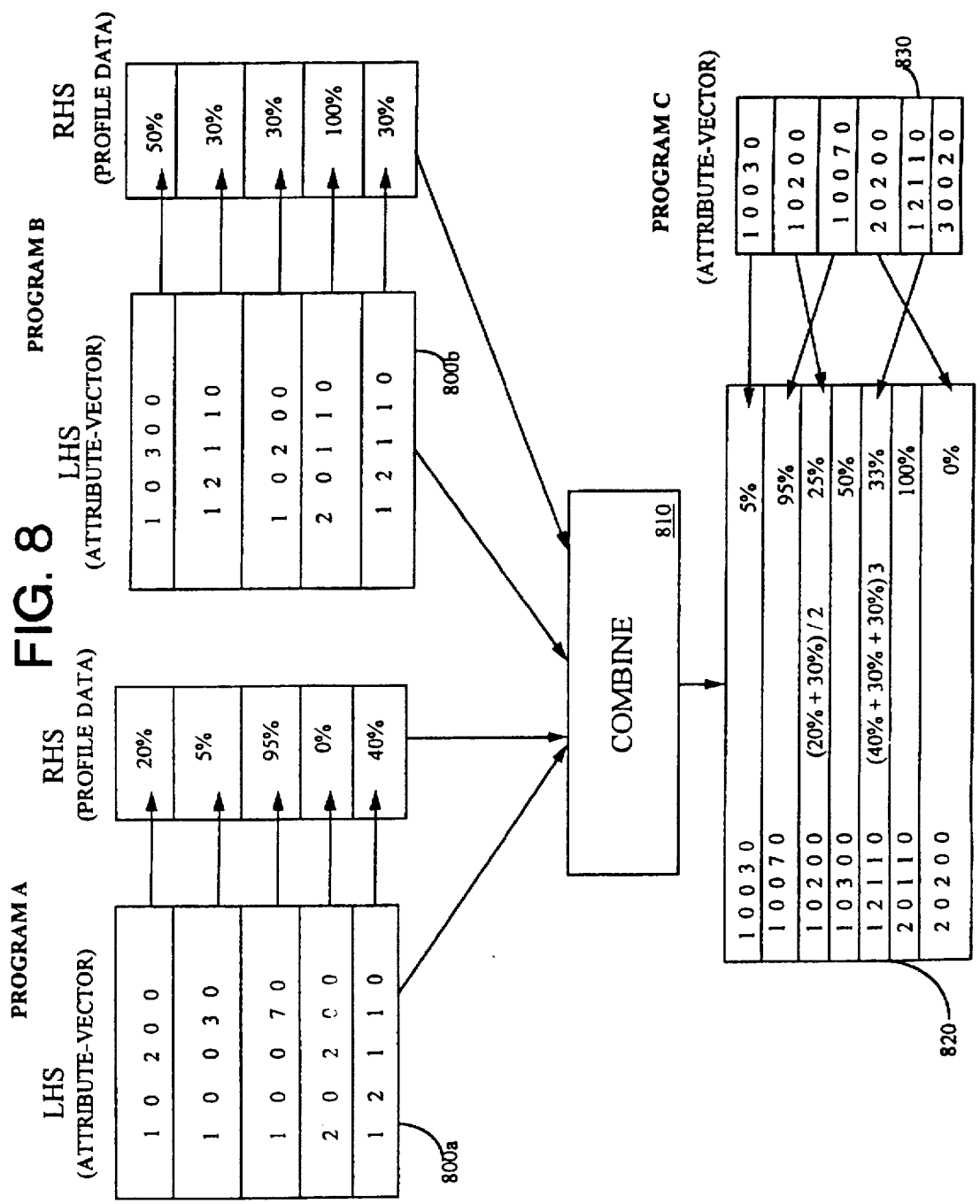
FIG. 8 is a block diagram illustrating the creation of the rules database of one embodiment of the compiler of the preferred embodiment.

At box 660, the compiler builder creates a database of rules by adding important rules from each program such as the takeness of a branch, loop backedge, the number of enclosing loops and "if-statements" as described in FIG. 8. The database is created by concatenating the list of rules from the various programs and combining rules that have the same attribute-vector. Once the compiler builder has created the rules database, a common heuristic predictor is created by creating a hash table of all the rules using the attribute-vector as an index. To predict the run-time behavior of a piece of code to be compiled, the predictor takes the attribute-vector of an observation point and checks to see if it matches any rule in the hash table.

If there is a match, the predictor predicts that the observation point will behave like the RHS of a rule (i.e., the attribute vector of the code being compiled matches an existing rule in the hash table). If there is no match, the predictor tells the compiler 105 that there is no information available. In that case the compiler 105 can make a default prediction.

Figure 7:
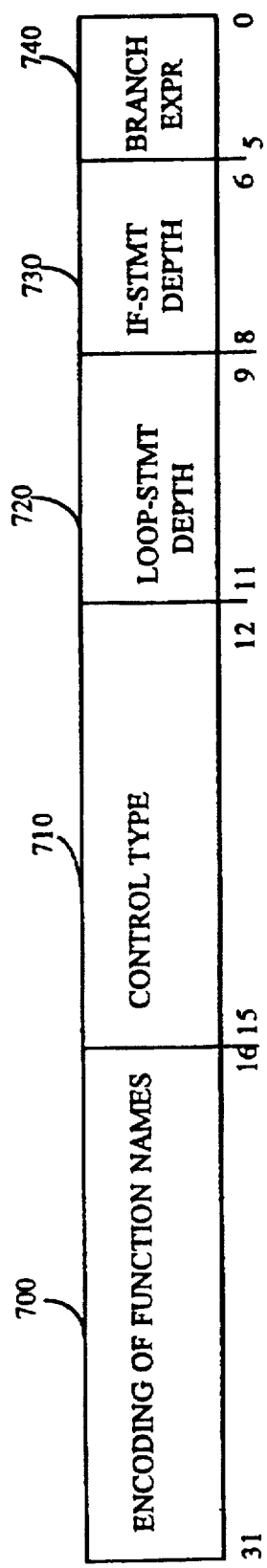
FIG. 7 is a block diagram illustrating a static attribute vector of one embodiment of the preferred embodiment.

Reference is now made to FIG. 7, which is a block diagram illustrating an example of an encoding scheme of a static vector attribute of the preferred embodiment. In one embodiment of the preferred embodiment, a 32-bit integer word is used to form a static attribute vector of some source program feature such as a basic block or a branch instruction.

The first sixteen bits 700 of the vector include encoding of a function name. The name may be longer than sixteen bits. The function name may be encoded by finding of the XOR of all the characters in a word or use of checksum. This information is then condensed into the first sixteen bits of the static attribute vector.

The next four bits 710 are used for the control flow type. These four bits describe which features of the program are of interest at a particular location. For example, how many times a loop in a particular location is iterated.

Suppose the code developer writes a "for-loop" or a "while-loop" statements that iterates several times. Since the preferred embodiment handles various programming styles, the control type helps in identifying what kinds of iteration are needed or encountered in various programs compiled. The reason for observing the control flow types in a program is because every code developer has different coding styles and by gathering some parts of the code, the present invention can gather distinct but often used features in the coding styles of various programs to compile the code.

The next three bits 720 define the loop-statement depth. These bits indicate the number of loops that are nested together. By gathering this information, the compiler 105 can tell what statements or instructions are executed often.

The next three bits 730 define the "if-statement" depth in a program. In other words, these statements define the conditional statements in a program. The greater the number of these statements in a program, the less the probability of execution.

The last six bits 740 define the branch conditional expression contents. These statements define branch conditions in a program. By gathering this information, the compiler 105 determines the number of branch conditional statements in a source program.

Reference is now made to FIG. 8, which is a block diagram illustrating an example of how the compiler 105 generates the heuristic predictor hash table of the preferred embodiment.

As illustrated at boxes 800a–b, the compiler builder generates attribute-vectors for various observations point for various categories of programs as described in box 640 in FIG. 6. For each attribute-vector that the compiler 105 generates, the compiler builder assigns a unique value to represent each component of the attribute-vector. As illustrated in box 880a for example, the first attribute-vector of an observation point for program A has been assigned the value "10200" with the corresponding profile data being "20%" to illustrate the number of times that for example a branch instruction that corresponds to the observation point is taken during program execution.

At box 810, the rules from various programs of the same category are concatenated, combining rules having the same attribute-vectors to create a rules database. For example, the two programs illustrated have three attribute-vectors that are similar. In developing the final rules database, attribute-vectors that are the same are combined so that the value of their profile data is averaged out as illustrated in box 820. The compiler builder generates rules for programs of different categories in a similar manner.

At box 820, the values of all the attribute-vectors are merged into one single hash table which becomes the predictor for the compiler 105. In merging the attribute-vectors, the program observation points with the same attribute-vectors are combined into a single rule with the profile data of similar rules being averaged out to get a single value to represent the profile data for the combined rules. Rules without duplicate attribute-vectors are simply entered into the hash table.

To predict the run-time behavior of a new program being compiled (i.e., Program C), the compiler 105 assigns attribute-vectors to observation points in the code using the same method as when building the compiler. The compiler does not have to profile the code being compiled because the compiler 105 predicts that specific attribute-vectors in the code being compiled will behave a rule already in the hash table if the attribute-vectors match and is assigned the corresponding profile data. By assigning profile data values to a new code being compiled, the compiler will not have to reprofile any new code presented to it after the compiler has been built.

Figure 10:
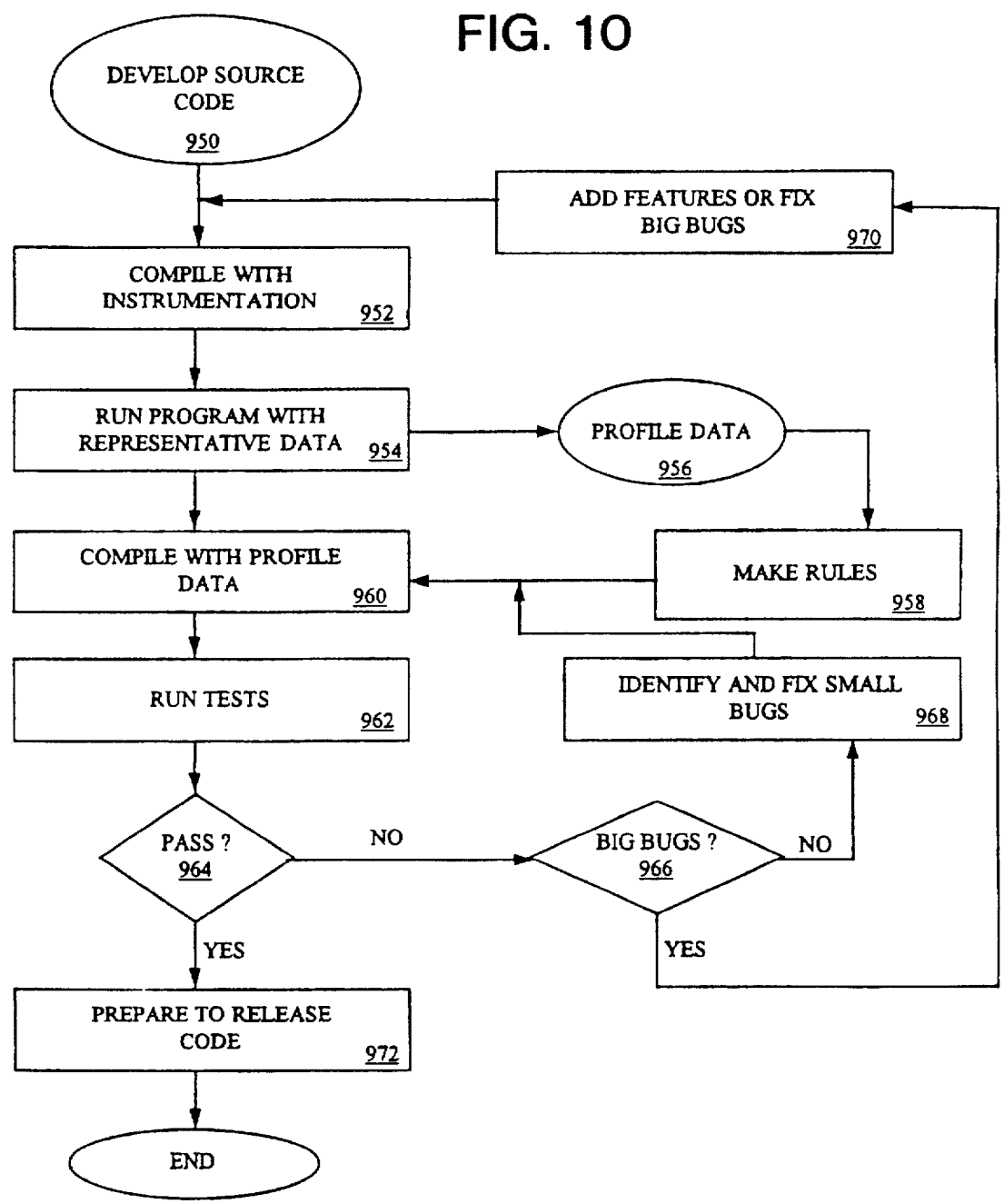
FIG. 10 is a flow chart illustrating an alternate profile data generation method of the preferred embodiment of the present invention.

To handle cases where the compiler 105 is unable to generate an optimized code because the attribute-vectors of the new code do not match any in the predictor, the code developer has the option to recompile the newly developed code using the alternate embodiment of the present invention as described in FIG. 10, or use prior art compilation means as described in FIG. 2.

Figure 9:
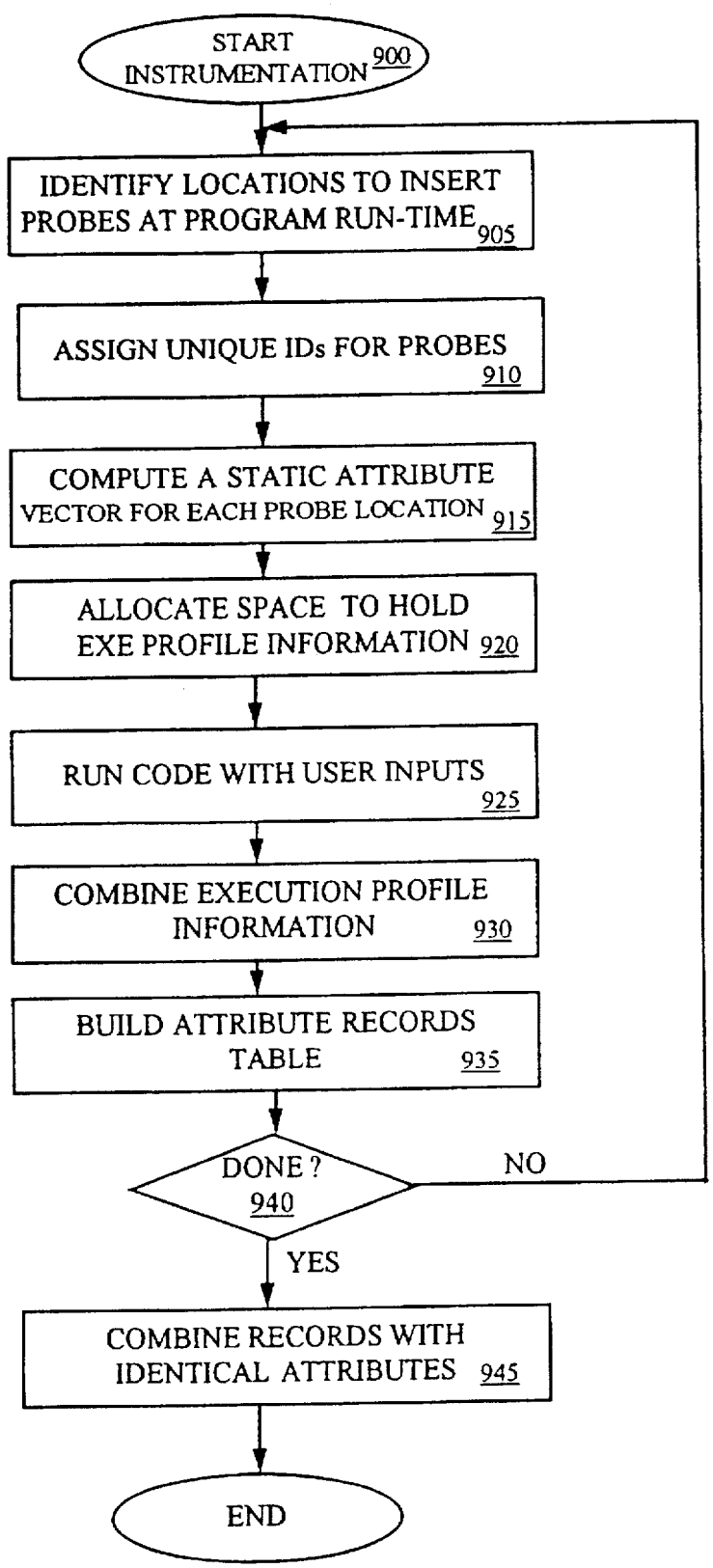
FIG. 9 is a flow chart illustrating of one embodiment of the instrumentation phase incorporated into the compiler of the preferred embodiment.

Reference is now made to FIG. 9, which is flow chart illustrating the instrumentation process of the preferred embodiment. The instrumentation of the source codes by the compiler 105 starts at box 900 where a single source code is presented to the compiler 105.

At box 905, the compiler 105 computes probe locations by identifying observation points at which to insert probes while compiling the code. For example each basic block could be a probe location. Processing continues at box 910.

At box 910, the compiler 105 assigns a unique ID to each probe location identified and processing continues at box 915 where the compiler 105 computes a static attribute record for each give probe location. An example of the attribute is illustrated in FIG. 7 above. The attribute record is saved in a database along with the unique ID for the corresponding probe location.

At box 920, the compiler 105 allocates space in the source data structure that will hold the execution profile information, (the basic block count), for each probe location. Processing continues at box 925.

At box 925, the instrumented source code is executed with one or more representative data inputs provides by the compiler developer. Execution of the representative data produces one dynamic count file for each data input. Processing continues at box 930.

At box 930, the dynamic counts files for the current code being instrumented are combined into one dynamic information table. The dynamic information table is then matched to a static attribute record from box 920 using the probe ID, at box 935. Matching the dynamic information table with the attribute record results in an attribute table made up of static attributes paired with dynamic counts being generated.

At decision box 940, the compiler determines if the current source code being instrumented is the last one to be instrumented. If this is false, the process returns to box 900; otherwise, processing continues at box 945 where the static attributes record and the profile records are combined into a database of the probe locations and the profile information of the source code. In combining the static attributes and profile records, duplicate attributes are eliminated to prevent the compiler 105 from performing the same process on the same code.

FIG. 10 is a flow chart illustrating an alternate embodiment of the preferred embodiment. The alternate embodiment of the preferred embodiment allows the code developer to generate profile data using conventional means for a program being compiled if the preferred embodiment of the present invention mispredicts the run-time behavior of the program. The code developer opts for the alternate embodiment of the present invention by logically selecting a switch which initializes this embodiment.

As illustrated in FIG. 10, the code developer begins a conventional code profiling at box 950 by presenting a developed source code to the compiler 105 to compile a program using conventional means. As illustrated inbox 952, the compiler 105 compiles the presented code with instrumentation using the instrumentation process described in FIG. 9.

At box 954, the instrumented code is executed using representative data supplied by the code developer. As the code is executed, a database of profile data is created at box 956 by the code developer. The code developer then passes the profile data through a "make rules" programs at box 958. The "make rules" program produces a rules table similar to the one described in box 660 in FIG. 6. However, the rules table generated in box 958 are specific to the user's program and does not include the combined information of the preferred embodiment.

At box 960 the instrumented code is recompiled with the rules from the rules table generated by the rules program in box 958 to generate an optimized object code. After the object code has been generated, the code is subjected to various tests at box 962.

If the optimized code passes the tests conducted at box 962, as determined at decision box 964, the code developer readies to release the code at box 972; otherwise, processing continues at decision box 966.

At box 966, the code developer decides whether the optimized object code is failing the tests conducted at box 962 due to major errors in the source code or minor errors. If the code developer determines that the errors in the source code are major, processing continues at box 970; otherwise, processing continues at box 968 if the errors are determined to be minor.

At box 968, the code developer identifies and fixes the minor errors detected in the source code and recompiles the code at box 960 with the profile data already generated during the previous compilation of the code However, if the identified bugs at box 966 are determined to be major, the code developer adds new features or fixes the major bugs at box 970 and recompiles the revised code again.

The difference between the code compilation cycle described above and the code compilation cycle of the prior art described in FIG. 3 is that in the prior art, anytime the code developer makes a code change, no matter how minor the change may be, the entire compilation cycle is repeated. However, with the alternate compilation method of the present invention, the entire compilation cycle is only repeated when there is a major fix to the source code.

APPENDIX 1

```
int a = 0;
fn( ) }
   int i;
   for (i=0;i<max;i++) {
      if(cc(i)) {
      }
   }
```

Appendix 1 sets forth a sample of a source code that the compiler builder may use in constructing the compiler of the preferred embodiment to generate the heuristic predictor of the compiler. The sample source program includes variables and a format well known in the art. The source code includes a global initialization variable (int a=–0), a function name ("fn()"), a local variable initialization ("int i"), a "for-loop" statement for the local variables within the function, and a conditional "if-statement. After the source code has been supplied to the compiler, the compiler inserts probes at each basic block to observe the run-time behavior of the block. The insertion of the probes results in the following:

```
fn( )
{
block_1:
    i=0
block_2:
    if(i>=100)gotoblock_6
block_3:
    t1 = call cc (i)
    if(t == 0)goto block_5
block_4:
    a = a + 1
block_5:    i = i + 1
    gotoblock_2:
block_6
    return
}
```

From the above example, the compiler identified six basic blocks, with three branches—two of which are conditional branches. The two conditional branches indicate how many times the program flow is interrupted. After the compiler has identified the observation points in the program, the compiler instruments the program by adding counters at each basic block. Although the compiler did identify six observation points, the points of interest to the compiler developer are the two conditional branches because they represent the number of time control flow in the program is interrupted. At the same time the compiler is adding counter at each block, the compiler also determines the static attribute-vector of the observation point. Adding counters at each block results in the following:

```
fn( )
block_1:
    counter [1] =counter [1] + 1
    i = 0
block_2:
    counter [2] = counter [2] + 1
    if (i>=100) goto block_6
block_3:
    counter [3] = counter [3] + 1
block_4:
    counter [4] = counter [4] + 1
    a = a + 1
block_5:
    gotoblock_2:
block_6:
    counter [6] = counter [6] + 1
    return
}
```

As stated above, the compiler also determines the attribute-vector associated with each observation point. For the code presented above, the compiler uses the static attributes including the loop nesting level, the if nesting level, and the branch type to represent the attribute-vectors for each observation point. Since there are six basic blocks, instrumenting the source code produces the following attribute-vectors for each block:

| block | loop level | if-level | branch type |
|-------|------------|----------|-------------|
| 1 | 0 | 0 | none |
| 2 | 0 | 0 | for loop |
| 3 | 1 | 0 | if |
| 4 | 1 | 1 | none |
| 5 | 1 | 0 | unconditional |
| 6 | 0 | 0 | none |

After instrumenting the source program, the compiler completes the compilation of the instrumented code by generating an object code. The program is then ready to execute with the representative data supplied by the compiler developer. Executing the program with the representative data produces profile information for the program. The profile information includes the six counters—one for each basic block. The counters represent the number of times a basic block was executed. For the program presented above, the profile information generated will be as follows:

| Counters | Probability |
|----------|-------------|
| 1 | none |
| 101 | 100% |
| 100 | 99% |
| 45 | 45% |
| 100 | 100% |
| 1 | none |

Each counter is then converted to indicate whether a block ends in a branch or not. If a block does not end in a branch, it has no probability.

After the program has been executed, a table of rules representing the attributes and the profile information of the program is formed using the attribute-vectors as the left hand side of the rule and the profile information the right hand side of the rule. The table of rules resulting from the execution of the sample program present above is as follows:

| loop level | if level | branch type | RHS |
|---|---|---|---|
| 0 | 0 | none | none |
| 0 | 0 | forloop | 99% |
| 1 | 0 | if | 45% |
| 1 | 1 | none | none |
| 1 | 0 | unconditional | 100% |
| 0 | 0 | none | none |

LHS

The rules formed are then consolidated to eliminate duplicates in the left hand side of the rules. In the example presented above, since basic blocks 1 and 6 have the same attribute-vectors and profile information, they are combined. The compiler builder performs the same attribute-vectors and profile information gathering for all the programs compiled during the developing of the compiler. The rules generated from all the programs compiled are then consolidated and concatenated into the heuristic predictor described in FIG. 8 above.

Thus, a method and apparatus for heuristically predicting profile information in a compiler has been described. The invention may be embodied in other specific forms without departing from its spirit or essential characteristics. The described embodiment is to be considered in all respects only as illustrative and not restrictive and the scope of the invention is, therefore, indicated by the appended claims rather than by the above descriptions. All changes which come within the meaning and range of equivalency of the claims are to be embraced within their scope.

What is claimed is:

1. In a computer system having a compiler for compiling source code, a method for developing and providing a heuristic predicting compiler for predicting run-time behavior of source code being compiled comprising the steps of:
   (a) compiling a plurality of source programs;
   (b) generating profile data for each said plurality of programs compiled;
   (c) generating attribute-vectors for each said programs compiled;
   (d) forming rules responsive to said attribute-vectors generated for each of said compiled programs and said profile data corresponding to each of said compiled programs; and
   (e) creating a database of said rules, wherein said database is incorporated in said compiler to predict said run-time behavior of programs being compiled.

2. The method of claim 1, wherein said plurality of programs includes a plurality of program categories including scientific, non-scientific, integer, and non-integer categories, and wherein a separate database of rules is created responsive to attribute-vectors and profile data from programs in each of said program categories.

3. The method of claim 1, wherein said step (c) includes the steps of:
   (c1) determining loop nesting levels of a basic block in each of said compiled programs;
   (c2) determining loop depth levels of said basic block in each of said compiled programs;
   (c3) determining "if-statements" nesting levels in each of said programs being compiled;
   (c4) determining said "if-statement" depth levels in each of said programs being compiled;
   (c5) determining the size of a loop body;
   (c6) determining the direction of a branch instruction in each of said programs being compiled; and
   (c7) determining the contents of each of said programs being compiled.

4. The method of claim 3, wherein upon completing said step (c) each said steps further includes consolidating the data from said steps to generate a static attribute-vector of said program being compiled.

5. The method of claim 1, wherein said step (d) includes a step of mapping said attribute-vectors generated for each of said programs with a corresponding profile data to form a rule comprising an attribute-vector and associating profile data.

6. The method of claim 1, wherein said step (e) includes a step of concatenating a list of said rules and combining said rules with the same attribute-vector to form a single rule.

7. The method of claim 1, wherein said step (e) further includes a step of creating a predictor responsive to said rules, by creating a hash table of said rules, so that said predictor uses said attribute-vector as an index to said hash table to determine whether said run-time behavior of said compiled program matches said rules.

8. In a computer system, a method for compiling source code comprising the steps of:
   (a) identifying observation points in said source code;
   (b) assigning one or more attribute-vectors to said observation points, wherein said assigned attribute-vectors uniquely identify said observation points;
   (c) comparing said attribute-vectors of said code with rules in a heuristic predictor table comprising a map of attribute-vectors with accompanying profile data;
   (d) if said attribute-vectors of said code in said step (c) matches said rules in said predictor table, said profile data for said attribute-vectors of said code are predicted; and
   (e) if said attribute-vectors in said step (c) mismatches said rules in said predictor table, said code is then compiled using an alternate method of profiling.

9. The method of claim 8, wherein said observation points includes program entities including basic blocks, branch statements, and control flow statements.

10. The method of claim 8 further comprising the step of selecting a switch to alternately compile said code using said alternate method of compiling of said compiler.

11. The method of claim 8, wherein said alternate method of compiling comprises the step of profiling said code to generate rules specific to said code so that said rules a reused in subsequent compilation of said code.

12. A heuristic predicting compiler for predicting the run-time behavior of source programs being compiled by said compiler comprising:
   (a) a heuristic predicting means for heuristically predicting run-time behavior of source programs, said heuristic predicting means including generating means for generating attribute vectors responsive to each of said source program;
   (b) a switching logic means for allowing said compiler to alternate between said predicting means and an alternate means of generating profile data for said program being compiled; and
   (c) a logic circuit means for conventionally generating profile data for said source program responsive to said predicting means mispredicting said run-time behavior of said source program, said logic circuit means includes a rule creating means for creating rules

15 responsive to said conventionally compiled source program, and wherein said rules are used in subsequent compilation of said source program by said compiler.

13. The compiler of claim 12 wherein said heuristic predicting means comprises:
   (a1) a mapping means for mapping said attribute-vectors generated for each of said source programs to a corresponding profile data of each of said source program to form a rule;
   (a2) a merging means for merging said rules with the same attribute-vector into a single rules list; and
   (a3) a predictor generation means for generating a heuristic predictor responsive to said source programs, wherein said predictor is created from a hash table of said rules using said attribute-vector as an index.

14. The compiler of claim 12, wherein said logic circuit means further includes a code modification option means for allowing minor source program changes without having to instrument said source program.

15. A heuristic profile prediction compiler for predicting run-time behavior of source programs being compiled, said compiler comprising:
   (a) a heuristic predictor for predicting said run-time behavior of said source program, (b) attribute-vectors responsive to static program regions of said source program;
   (c) a logic switch circuit for allowing said compiler alternate between a heuristic predicting mode and a conventional compilation mode; and
   (d) a conventional profile data generating circuit for conventionally generating profile data of said source program in response to said predictor failing to predict said run-time behavior of said source program, wherein said conventional profile data generating circuit includes a database of execution counter values of said source program, and wherein said counter values are used as said compiler directives in subsequent source program compilations.

16. The compiler of claim 15, wherein said heuristic predictor comprises:
   (a1) a rule responsive to a pair of said attribute-vectors and profile data responsive to said source program; and
   (a2) a database of said rules responsive to merging said rules from a variety of said source programs with the same attribute-vectors, wherein a hash table of said predictor is formed responsive to concatenating said database of said rule.

17. In a computer system having a compiler, a method for developing and providing a heuristic predictor for predicting run-time behavior of programs being compiled, the method comprising the steps of:
   (a) compiling a variety of programs within different programming categories to generate profile data and static attribute-vectors responsive to each of said compiled programs;
   (b) generating said heuristic predictor based on said compiled variety of programs, said heuristic predictor being incorporated into said compiler to predict said run-time behavior of programs, the generating of said heuristic predictor including the step of creating a rules list from said compiled programs, said step of creating rules including;
      (b1) mapping said attribute-vector, for code entities including basic blocks, branch instructions, and control flow statements, within each of said programs

16 with said profile data for each of said compiled programs into an attribute-vector, profile data pair;
      (b2) forming a rule by consolidating said profile data from each of said variety of programs associated with the same attribute-vector;
      (b3) merging rules from said variety of programs by concatenating said rules and combining rules with the same attribute-vectors;
      (b4) creating a hash table of said rules using said attribute-vectors as indices; and
      (b5) creating said predictor based on a database of said rules from said hash table responsive to said compiled programs to predict subsequent run-time behavior of programs compiled by said compiler.

18. A heuristic predicting compiler for predicting the run-time behavior of source programs being compiled by said compiler comprising:
   (a) heuristic predicting means for heuristically predicting run-time behavior of source programs, said heuristic predicting means comprising,
      (a1) generating means for generating attribute vectors responsive to each of said source programs,
      (a2) mapping means for mapping said attribute-vectors generated for each of said source programs to a corresponding profile data of each of said source program to form a rule,
      (a3) merging means for merging said rules with the same attribute-vector into a rules list,
      (a4) predictor generation means for generating a heuristic predictor responsive to said source programs, wherein said heuristic predictor is created from a hash table of said rules using said attribute-vector as an index;
   (b) switching logic means for allowing said compiler to alternate between said predicting means and an alternate means of generating profile data for said program being compiled; and
   (c) logic circuit means for conventionally generating profile data for said source program responsive to said predicting means mispredicting said run-time behavior of said source program.

19. The compiler of claim 18, wherein said logic circuit means includes a rule creating means for creating rules responsive to said conventionally compiled source program, and wherein said rules are used in subsequent compilation of said source program by said compiler.

20. The compiler of claim 18, wherein said logic circuit means includes a code modification option means for allowing minor source program changes without having to instrument said source program.

21. A heuristic profile prediction compiler for predicting run-time behavior of source programs being compiled, said compiler comprising:
   (a) a heuristic predictor for predicting said run-time behavior of said source program, said heuristic predictor comprising,
      (a1) attribute-vectors responsive to static program regions of said source program,
      (a2) a rule responsive to a pair of said attribute-vectors and profile data responsive to said source program,
      (a3) a database of said rules merged from a variety of source programs with same attribute-vectors, wherein the predictor is based on said database of said rules from a hash table;
   (b) a logic switch circuit for allowing said compiler to alternate between said heuristic predicting mode and a conventional compilation mode; and (c) a conventional profile data generating circuit for conventionally generating profile data of said source program in response to said predictor failing to predict said run-time behavior of said source program.

22. The compiler of claim 21, wherein said conventional profile data generating circuit includes a database of execution counter values of said source program, and wherein said counter values are used as compiler directives in subsequent source program compilations.

23. In a computer system having a compiler for compiling source code, a method for developing and providing a heuristic predicting compiler for predicting run-time behavior of source code being compiled comprising the steps of:

(a) compiling a plurality of source programs;

(b) generating profile data for each said plurality of programs compiled;

(c) generating attribute-vectors for each said programs compiled; and (d) forming rules responsive to said attribute-vectors generated for each of said compiled programs and said profile data corresponding to each of said compiled programs.

24. The method of claim 23, wherein said plurality of programs includes a plurality of program categories including scientific, non-scientific, integer, and non-integer categories, and wherein a separate database of rules is created responsive to attribute-vectors and profile data from programs in each of said program categories.

25. The method of claim 23, wherein said step (c) includes the steps of:

(c1) determining loop nesting levels of a basic block in each of said compiled programs;

(c2) determining loop depth levels of said basic block in each of said compiled programs;

(c3) determining "if-statements" nesting levels in each of said programs being compiled;

(c4) determining said "if-statement" depth levels in each of said programs being compiled;

(c5) determining the size of a loop body;

(c6) determining the direction of a branch instruction in each of said programs being compiled; and (c7) determining the contents of each of said programs being compiled.

26. The method of claim 25, wherein upon completing said step (c) each said steps further includes consolidating the data from said steps to generate a static attribute-vector of said program being compiled.

27. The method of claim 23, wherein said step (d) includes a step of mapping said attribute-vectors generated for each of said programs with a corresponding profile data to form a rule comprising an attribute-vector and associating profile data.

28. The method of claim 23, wherein upon completing step (d) further includes a step (e) of creating a database of said rules, wherein said database is incorporated in said compiler to predict said run-time behavior of programs being compiled.

29. The method of claim 28, wherein said step (e) includes a step of concatenating a list of said rules and combining said rules with the same attribute-vector to form a single rule.

30. The method of claim 28, wherein said step (e) further includes a step of creating a predictor responsive to said rules, by creating a hash table of said rules, so that said predictor uses said attribute-vector as an index to said hash table to determine whether said run-time behavior of said compiled program matches said rules.

* * * * *